US007681226B2

(12) United States Patent
Kraemer et al.

(10) Patent No.: US 7,681,226 B2
(45) Date of Patent: Mar. 16, 2010

(54) METHODS AND APPARATUS PROVIDING SECURITY FOR MULTIPLE OPERATIONAL STATES OF A COMPUTERIZED DEVICE

(75) Inventors: Jeffrey A. Kraemer, Wellesley, MA (US); Debra L. Malver, Needham Heights, MA (US)

(73) Assignee: Cisco Technology, Inc., San Jose, CA (US)

( * ) Notice: Subject to any disclaimer, the term of this patent is extended or adjusted under 35 U.S.C. 154(b) by 1230 days.

(21) Appl. No.: 11/046,302

(22) Filed: Jan. 28, 2005

(65) Prior Publication Data

US 2006/0174319 A1    Aug. 3, 2006

(51) Int. Cl.
   *G06F 17/00* (2006.01)
(52) U.S. Cl. .............................................. 726/1; 713/2
(58) Field of Classification Search ......... 713/189–194, 713/2; 726/1, 22–25
   See application file for complete search history.

(56) References Cited

U.S. PATENT DOCUMENTS

| | | | | | |
|---|---|---|---|---|---|
| 6,006,328 | A | * | 12/1999 | Drake | 726/23 |
| 6,243,813 | B1 | * | 6/2001 | Kong | 713/193 |
| 6,484,262 | B1 | * | 11/2002 | Herzi | 726/34 |
| 6,775,536 | B1 | | 8/2004 | Geiger | |
| 7,085,936 | B1 | * | 8/2006 | Moran | 726/5 |
| 7,213,146 | B2 | * | 5/2007 | Stehlin | 713/166 |
| 7,219,239 | B1 | * | 5/2007 | Njemanze et al. | 726/3 |
| 7,302,698 | B1 | * | 11/2007 | Proudler et al. | 726/2 |
| 2005/0005005 | A1 | | 1/2005 | Styles et al. | |
| 2005/0005137 | A1 | * | 1/2005 | Benedikt | 713/189 |

OTHER PUBLICATIONS

Guski, R., Dayka, J.C., Distel, L.N., Farrell, W.B., Gdaniec, K.A., Kelly, M.J., Nelson. M.A., Overby, L.H., and Robinson, L.G. Security on z/OS: Comprehensive, Current and Flexible IBM Systems Journal, vol. 40, No. 3 pp. 696-720.
Andersson, Jesper snd Ritzau, Tobias Dynamic Code Update in JDRUMS Vaxjo Universoty, School of Mathematics and Systems Engineering 2000, Sweden pp. 1-4.
Corradi, A., Montanari, R. and Tibaldi, D. Context-Based Access Control Ubiquitous Service Provisioning Department of Electronics, University of Bologna, Italy 2004 pp. 1-16.
Dotzer, Florian Aspects of Multi-Application Smart Card Management Systems Lehstuhl Universitat Munchen, 2002 pp. 1-138.

* cited by examiner

*Primary Examiner*—Kambiz Zand
*Assistant Examiner*—Amare Tabor
(74) *Attorney, Agent, or Firm*—Hickman Palermo Truong & Becker LLP

(57) ABSTRACT

A system controls security during operation of a computerized device by enforcing a first security policy during first operational state of the computerized device. Enforcement of the first security policy provides a first level access to resources within the computerized device by processes operating in the computerized device. The system detects a transition operation of the computerized device that occurs during enforcement of the first security policy indicating that operation of the computerized device is transitioning from the first operational state to a second operational state and in response, enforces a second security policy corresponding to the second operational state to provide a level of access to the resources within the computerized device that corresponds to the second operational state during operation of the second operational state. This can be repeated for many different states including boot time, normal runtime, installation, shutdown, and a compromised state.

24 Claims, 7 Drawing Sheets

METHODS AND APPARATUS PROVIDING SECURITY FOR MULTIPLE OPERATIONAL STATES OF A COMPUTERIZED DEVICE

Computer systems, networks and data centers are exposed to a constant and differing variety of attacks that expose vulnerabilities of such systems in order to compromise their security and/or operation. As an example, various forms of malicious software program attacks include viruses, worms, Trojan horses and the like that computer systems can obtain and install over a network such as the Internet. Quite often, users of such computer systems are not even aware that such malicious programs have been obtained and installed within the computer system. Once installed within a computer, a malicious program that executes might disrupt operation of the computer to a point of inoperability and/or might spread itself to other computers within a network or data center by exploiting vulnerabilities of the computer's operating system or resident application programs. Other installed malicious programs might operate within a computer to secretly extract and transmit information within the computer to remote computer systems for various suspect purposes. As an example, spyware is a form of software that can be installed and executed in the background (e.g., unbeknownst to users) of a computer system and can perform undesirable processing operations such as tracking, recording and transmitting user input from the spyware-resident computer system to a remote computer system. Spyware can allow remote computers to silently obtain otherwise confidential information such as usernames and passwords required to access protected data, lists, contents of files or even remote web sites user account information.

In most cases involving operation of a malicious program, that program must be installed in some manner into the computer system. In some cases, installation of a software application (i.e., a program) can be as simple as copying the program to a location in memory or onto storage associated with the computer system. In such cases, the program might be a self-contained executable that does not need to modify any computer system configuration in order to support its execution. Thus an executable file that is copied to disk and then executed can be one example of an installation operation that occurs. More complex software programs might require the user of certain system services or may require modification of system configuration settings of the computer system and thus may use a special installation program, such as an installation wizard, to perform an installation process. In such cases, many operating systems such as Microsoft Windows (Windows is a trademark of Microsoft Corporation of Redmond, Wash., USA) provide special installation programs or libraries that software programs can invoke upon startup to guide a user through an installation process. These more complex software installation processes may require placement of data within, or other modification of, operating system configuration settings such as addition or modification of operating system registry values, modification of file system data, insertion of dynamically linked libraries, and/or other such tasks that must occur during the installation process.

Computer system developers, software developers and security experts have created many types of conventional preventive measures that operate within conventional computer systems in an attempt to prevent installation and operation of malicious programs that may compromise proper operation of the computer systems. As an example, conventional virus detection software operates to periodically download a set of virus definitions from a remotely located server. Once the virus detection software obtains the definitions, the security software can monitor incoming data received by the computer system, such as email messages containing attachments, to identify viruses defined within the virus definitions that might be present within the data attached to such email messages. Such data might be obtained over a network or might be unknowingly resident on a computer readable medium, such as a disk or CD-ROM, that a user inserts into the computer during a process of installing a software program. Upon detection of data containing a virus or a malicious program, the virus detection software quarantines the identified data or attachment so that a user of the computer system will not be able to install the program thus preventing the execution of code that might result in compromising the computer's operation.

Other examples of conventional malicious attacks, intrusions, or undesirable processing that can cause problems within computer systems or even entire computer networks include virus attacks, worm attacks, trojan horse attacks, denial-of-service attacks, a buffer overflow operations, execution of malformed application data, and execution of malicious mobile code. Virus attacks, worm attacks, and trojan horse attacks are variants of each other that generally involve the installation and execution of a program that, once installed, performs some undesired processing operations to comprise a computers' proper operation. Buffer overflow attacks occur when installed programs do not provide appropriate checks of data stored in internal data structures within the software that result in overwriting surrounding areas of memory. Attacks based on buffer overflows might allow an attacker to execute arbitrary code on the target system to invoke privileged access, destroy data, or perform other undesirable functions. Malformed application data attacks might result in an installed application containing a code section that, if installed and executed, provides or exposes access to resources that would otherwise be private to the application. Such attacks can expose vulnerabilities due to an incorrect implementation of the application, for example by failing to provide appropriate data validity checks, or allowing data stream parsing errors, and the like.

Many of the conventional malicious programs and mechanisms for attack of computer systems, such as viruses and worms, include the ability to redistribute themselves to other computer systems or devices within a computer network, such that several computers become infected and experience the malicious processing activities discussed above. Some conventional attempts to prevent redistribution of malicious programs include implementing malicious program detection mechanisms such as virus detection software within firewalls or gateways between different portions of networked computer systems in order to halt propagation of malicious programs to sub-networks.

SUMMARY

Current mechanisms for providing security to computers and computer networks during operation of software applications and programs suffer from a variety of deficiencies. Embodiments of the invention provide numerous advantages over such conventional systems to avoid such deficiencies. In particular, conventional systems for protecting computer systems rely on a single set of rules that a reference monitor applies no matter what state the computer system is operating in. For example, a security monitor program might be equipped with a single set or rules that are applied if the computer is booting up, and during normal execution of programs, and during malicious activity such as virus infection within the computer, and during installation of programs, and when the computer is shutting down. The conventional computer monitoring software uses a single set of rules to define actions to be taken in the event of a security violation, regardless of which of these states the computer is in.

As an example, consider a state of a computer system during installation of a software application. Conventional protection from installation of malicious programs, such as conventional virus detection software programs, rely strictly on the ability to periodically remotely receive information such as virus definitions that allow the conventional security software to identify and quarantine malicious programs. Many of the most common conventional forms of security software such as virus definitions programs use fixed normal security policies that rely upon obtaining the periodic virus definition updates from a centralized server accessed over the Internet that is maintained by the vendor of the security software. As a result, the most recent virus definition updates only reflects those viruses that have been recently detected, fingerprinted in inserted into the virus definition file by the vendor of that maintains and distributes the virus definition files. Thus conventional security programs do not provide multiple security levels for different operational states of the computer—such as one for normal operation of the computer system during which time software applications are not being installed, and a second security policy that alters security settings during a time when software applications are being installed, and another security policy that provides security protection rules associated with boot-time in the computer, and so forth.

Since conventional security products enforce a single normal security policy that is crafted for normal operation of the computer system, even when the computer is in different states, these conventional security programs, such as virus detection software, try to protect the configuration of the computer system and the applications at the same time using a single security policy but the security risks change as the computer transitions from state to state. One problem with this approach using the installation state as an example is that when a user attempts to upgrade or install a new software application into the computer system, this action can require a legitimate modification of the computer system configuration but that may cause a security system violation when detected by conventional security programs.

Conventional security programs such as monitoring programs that constantly monitor or look for certain modifications being made to a computer system configuration in order to prevent unauthorized configurations changes thus provide only one security level. As an example, a commonly used conventional computer security monitoring program is called "Spybot Search and Destroy" (hereinafter Spybot) produced by Safer Networking Limited of Dublin, Ireland. Spybot provides a resident software program that executes in the background in conjunction with the operating system of a personal computer. Spybot monitors the computer system operation for certain events and also detects the presence of programs that are well known to be malicious or problematic in nature. In operation, Spybot requires the user to download a most recent detections update that contains a list of known programs and computer system configuration changes that might cause problems. Once the detections are obtained, Spybot will simply execute and look for the presence of any known programs in the detections list and will also monitor the computer system's operation to identify situations when a process is attempting to modify a known system configuration setting that might create problems by installing a know problematic program. As another example, Spybot can detect any attempts by any processes to modify registry value settings in the Microsoft Windows Registry. In the event of detection of such attempted registry modifications, Spybot will prompt the user to determine if the user desires the registry modification to be allowed. In this manner, Spybot provides a single level of security that does not dynamically adapt to changing conditions within the computer system. That is, Spybot and similar conventional monitoring programs that detect system configuration setting modifications, that often occur for example during software installation, to be a violation of the security policy provided by such monitoring programs and thus results in either denying the action outright or prompting the user to determine if the action should be allowed.

Thus, using conventional security monitoring tools such as Spybot, legitimate state changes in the computer system, such as a transition from a normal operation state to an installation state to perform installation of software by a user that is not malicious in nature still causes a violation of the security policy that results in a warning or "false positive" to the user to determine if the user desires the operation to proceed. This slows down the installation process of the program the user wishes to install and quite often, the prompts provided to the user are cryptic in nature and unless that user is quite knowledgeable in the area of registry system key settings, that user will often not understand what the requested change to a registry setting really means. If a user indicates that he or she does not want to change to be made, the software may be installed incorrectly, thus resulting in incorrect program or system operation. As such, when using conventional monitoring programs that attempt to limit or restrict access to protected system configuration settings such as operating system settings, registry settings, library access, and the like, such conventional systems might result in failure to install a legitimate application properly.

When using conventional security monitoring tools such as Spybot, a user may overcome his or her frustration with being prompted for all the false positives that indicated each and every system configuration change and may simply disable the security monitoring software to allow for easy software installation. However, this is problematic since the user may forget to re-enable the security software after installation is complete thus leaving the computer vulnerable to a non-legitimate system configuration change that a malicious program may perform thereafter. Thus, by only providing one security level and treating all system configuration changes as a potentially bad event, the aforementioned drawbacks are present in conventional system security software.

Embodiments of the invention significantly overcome the aforementioned drawbacks and provide a security system for computer systems and networks that provides a behavioral-based security solution that dynamically applies different security settings, rules or policies in the event of detection of occurrences of different states of the computer system. Security policies can be created for states such as boot-up, runtime, installation, shutdown, and a compromised state in which the security agent software has detected the presence of a known malicious program such as a virus. In particular, a security agent provided by embodiments of the invention controls security during operation of a computerized device using different security policies that are applied in different circumstances.

Embodiments of the invention thus provide systems, apparatus and methods for controlling security during operation of a computerized device using multiple security policies for multiple operation states of the device. The system is able to enforce a first security policy during first operational state of the computerized device, such as boot-time, or in any other state, such as normal run-time, an installation state, a compromised state (e.g., when it is determined that the computer is, for example, infected with a malicious program), a shut-down state, or any other categorically operational state. Enforcement of the first security policy provides a first level access to resources within the computerized device by processes operating in the computerized device in that state. The system can further detecting a transition operation of the computerized device that occurs during enforcement of the first security policy. The transition operation indicates that operation of the computerized device is transitioning from the first operational state to a second operational state, such as from boot-time to normal run-time, or from normal run-time to a software installation state.

In response to detection of the transition operation, the system is able to enforce a second security policy corresponding to the second operational state to provide a level of access to the resources within the computerized device that corresponds to the second operational state during operation of processes in the second operational state. The system can repeat the processing steps of detecting a transition operation and enforcing an security policy corresponding to the transitioned-to operational state for a plurality of operational states of the computerized device, such that as operation of the computer system transitions from operational state to operational state, different security policies corresponding to those operational states are enforced during operation of those states.

By way of example, in one configuration, the security agent enforces a non-installation security policy during non-installation operation of the computerized device. Enforcement of the non-installation security policy provides non-installation level access to resources within the computerized device by processes operating in the computerized device. Non-installation level access might allow, for example, user level application processes to access full networking resources, but might not allow access to system configuration settings such as registry modifications. The non-installation security policy thus provides a more restrictive level of access to resources within the computerized device such as operating system settings, registry value settings, dynamically linked libraries being added or removed from the computerized device, or other such system-level changes. At the same time, the non-installation security policy provides a less restrictive level of access to resources within the computerized device such as network access to or from the computerized device and access to other user applications.

The security agent further operates to detect an installation operation of the computerized device that occurs during enforcement of the non-installation security policy. The installation operation indicates that at least one installation is to be performed in the computerized device. This can include detecting a requirement to install a software application within the computerized device. Examples of detection of an installation operation can be startup of an installation wizard, or a process making a system call to execute a library commonly associated with installing software, or identifying a first time execution of a process or program. Other examples can include detection of attempts to access a system configuration setting that is associated with installing software.

In response to detection of the installation operation, the security agent enforces an installation security policy to provide installation level access to the resources within the computerized device during the installation operation. Enforcing the installation security policy in one configuration relaxes or provides a less restrictive level of access to certain resources within the computerized device such as, for example, operating system settings, registry values, and access to modification to dynamically linked libraries while at the same time providing a more restrictive level of access to other resources within the computerized device such as, for example, third party software applications, network access to network locations not related to the installation, email access, and so forth. Such access would otherwise be restricted if the non-installation security policy were enforced.

In response to an end-installation event, the security agent re-enforces the non-installation security policy. An end-installation event may be, for example, expiration of an installation timer indicating that an installation time period has elapsed or an indication from the user that installation is complete or completion of execution of the installation process. In response to the end-installation event, the security agent reverts to enforcement of a non-installation security policy that provides restricted access to resources that were required during the installation process.

In this manner, the system of the invention is able to dynamically detect an installation operation being performed and ca transition to a security policy that is optimized for software (or hardware) installations within the device. Further details of other configurations and features will be explained in detail herein.

Other embodiments of the invention include any type of computerized device, workstation, handheld or laptop computer, or the like configured with software and/or circuitry (e.g., a processor) to process any or all of the method operations disclosed herein. In other words, a computerized device or a processor that is programmed or configured to operate as explained herein is considered an embodiment of the invention.

Other embodiments of the invention that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments of the invention.

It is to be understood that the system of the invention can be embodied strictly as a software program, as software and hardware, or as hardware alone such as within a processor, or within an operating system. Example embodiments of the invention may be implemented within computer systems, processors, and computer program products and/or software applications manufactured by Cisco Systems, Inc. of San Jose, Calif., USA.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not neces

DETAILED DESCRIPTION

Embodiments of the invention provide systems, apparatus and methods for controlling security during operation of a computerized device using multiple security policies for multiple operation states of the device. The system is able to enforce a first security policy during first operational state of the computerized device, such as boot-time, or in any other state, such as normal run-time, an installation state, a compromised state (e.g., when it is determined that the computer is, for example, infected with a malicious program), a shutdown state, or any other categorically operational state. Enforcement of the first security policy provides a first level access to resources within the computerized device by processes operating in the computerized device in that state. The system can further detecting a transition operation of the computerized device that occurs during enforcement of the first security policy. The transition operation indicates that operation of the computerized device is transitioning from the first operational state to a second operational state, such as from boot-time to normal run-time, or from normal run-time to a software installation state.

In response to detection of the transition operation, the system is able to enforce a second security policy corresponding to the second operational state to provide a level of access to the resources within the computerized device that corresponds to the second operational state during operation of processes in the second operational state. The system can repeat the processing steps of detecting a transition operation and enforcing an security policy corresponding to the transitioned-to operational state for a plurality of operational states of the computerized device, such that as operation of the computer system transitions from operational state to operational state, different security policies corresponding to those operational states are enforced during operation of those states. A detailed discussion of one example of state transition will now be provided to illustrate example embodiments of the invention in which an installation state is used by way of example only.

Figure 1:
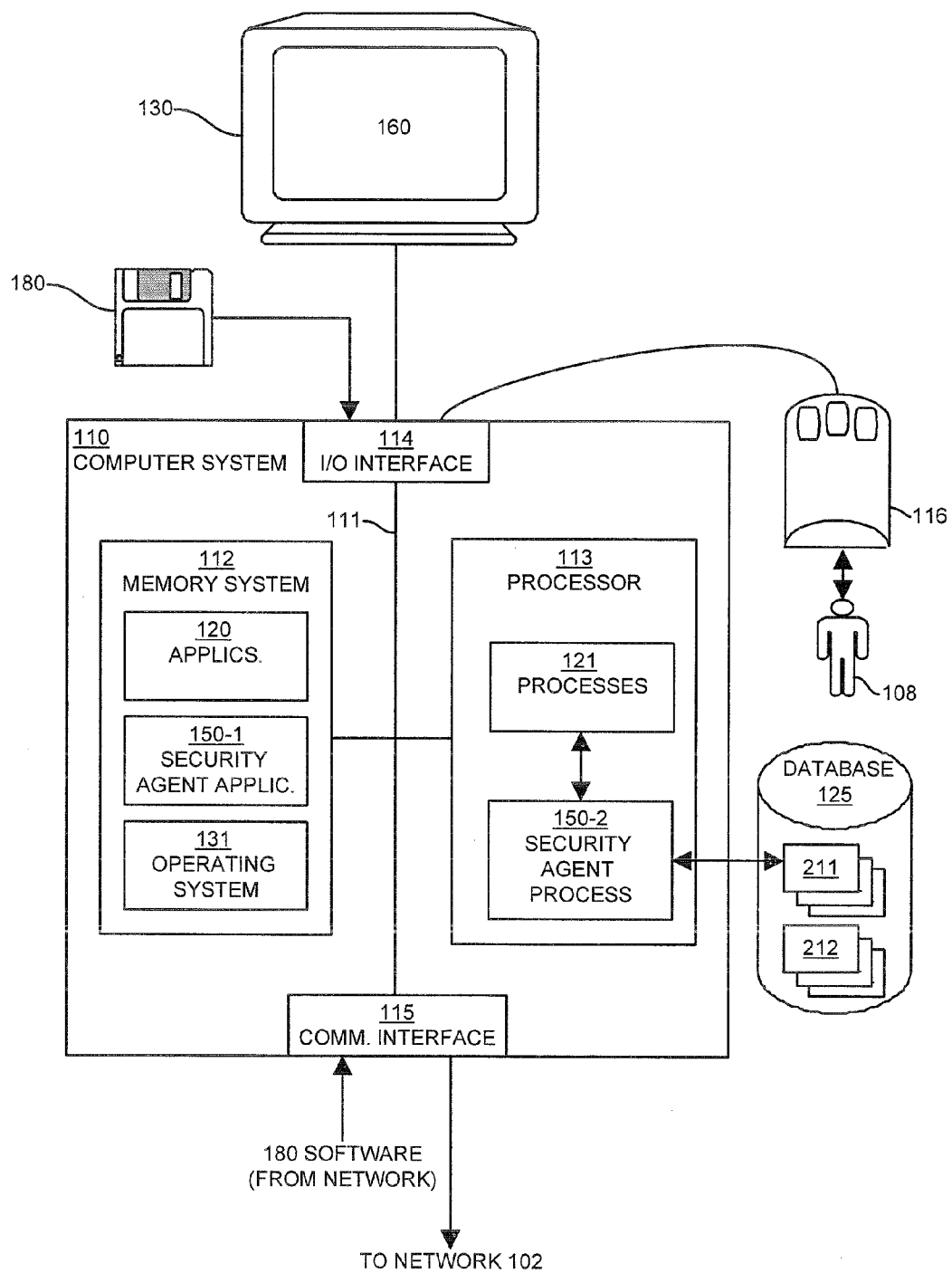
- FIG. 1 illustrates an example configuration of a network environment that includes a security system configured as disclosed herein.

FIG. 1 illustrates an example computer system 110 suitable for use in explaining example embodiments of the invention. The computer system 110 executes, runs, interprets, operates or otherwise performs a security agent 150 (application 150-1 and process 150-2) that provides security to the computerized system 110 during installation operations. The computer system 110 may be any type of computerized device such as a personal computer, workstation, portable computing device, console, laptop, network terminal, data communications device (e.g., router, switch, etc.) or the like. As shown in this example, the computerized device 110 includes an interconnection mechanism 111 such as a data bus or other circuitry that couples a memory system 112, a processor 113, an input/output interface 114, and a communications interface 115. An input device 116 (e.g., one or more user controlled devices such as a keyboard, mouse, etc.) couples to processor 113 through I/O interface 114 and enables a user 108 to provide input commands and generally control the computer system 110 via the display 130 that might provide, for example, a graphical user interface 160. Also in this example configuration, a database 125 stores both installation security policies 212, as well as one or more non-installation security policies 211 that the a security agent 150 can access as needed in accordance with techniques described herein. It is to be understood that the database could be stored or loaded into memory within the computer. The communications interface 115 enables the computer system 110 to communicate with other devices (i.e., other computers) on a network 102. This can allow for remote software installations into the computer system 110 from remote computer systems.

The memory system 112 is any type of computer readable medium and in this example is encoded with one or more applications 120, an operating system 131, and a security agent application 150-1 configured in accordance with embodiments explained herein. The applications 120 are any type of third party or user-level software applications. Examples include email, World Wide Web applications, specific purpose or dedicated software applications or the like that may be executed by the processor 113. Likewise, the operating system 130 may be any type of operating system such as Windows, Unix, or the like. The security agent application 150-1 may be embodied as software code such as data and/or logic instructions (e.g., code stored in the memory or on another computer readable medium such as a removable disk) that supports processing functionality according to different embodiments described herein.

During general operation of the computer system 110, the processor 113 accesses the memory system 112 via the interconnect 111 in order to launch, run, execute, interpret or otherwise perform the logic instructions of the applications 120, the security agent application 150-1 and the operating system 131 as needed. Execution of security agent application 150-1 in this manner produces processing functionality in a security agent process 150-2 that embodies the run-time operation of configurations described herein. In other words, the security agent process 150-2 represents one or more portions or runtime instances of security agent application 150-1 (or the entire application 150-1) performing or executing within or upon the processor 113 in the computerized device 110 at runtime.

Generally, the security agent process 150-2 operates as explained herein to provide enforcement of one or more non-installation security policies 211 and one or more installation security policies 212 depending upon whether or not an installation operation is being performed in the computer system 110. When installation operations are not occurring within the computer system 110, the security agent 150 and forces none-installation security policies 211 that control access to various resources within the computer system 110 on behalf of executing processes 121. As an example, using rules specified in the non-installation security policies 211, the security agent 150 during non-installation operations can provide highly restricted access to operating system configuration settings and other privileged areas of the computer system 110, while at the same time providing less restrictive access to computer system resources such as network communications and invocation of third party applications 120. Embodiments of the invention are based in part on an observation that, to allow for software installations to occur within the computer system 110, the security agent 150 provides for a looser installation security policy 212 that allows access to traditionally more restricted resources within the computer system 110 (that are normally restricted during non-installation execution of applications) in order to avoid high rates of false positives (i.e., suspected security violations) during application of security while undergoing an installation process such as installing software 180. This is because installation of software typically involves legitimate modifications to traditionally restricted areas of the computer system such as system configuration settings, modification of libraries, and the like.

An example of an installation operation is demonstrated in FIG. 1 where the user 108 begins installation of software 180 into the computer system 110 via the input-output interface 114 (e.g., via loading software on a computer readable medium into a disk or optical drive). When the security agent 150 detects the initiation of the installation process by the user 108 of the software application 180, the security agent 150 transitions from enforcing the non-installation security policy 211 to enforcing the installation security policy 212. Enforcement of the installation security policy 212 can provide more restricted access to certain resources within the computer system 110 such as the ability to execute third party applications by processes associated with the software installation process while at the same time providing less restrictive access to those resources within the computer system 110 that are typically required to be modified during installation and that during normal secure non-installation execution of applications would not traditionally be allowed to be modified.

In this manner, embodiments of the invention provide the ability to dynamically modify security policies applied within the computer system 110 in response to detection of installation of software. Since the requirements of a software installation represent, in many cases, an opposite security policy of a non-installation security policies that is applied during normal or non-installation operations, resources such as system configuration settings that are normally restricted during normal execution of processes must often be allowed to be modified during software installations. Accordingly, the security agent 150 described herein provides the ability to allow an installation operation to modify such normally restricted resources within the computerized device while at the same time disallowing access to certain resources which are normally allowed during non-installation operations. As an example, during a software installation, the installation security policy 212 may specify that network access is to be disallowed for any processes associated with the software installation to network destinations other than those associated with the installation. This can prevent, for example, a software installation, that might unknowingly (to the user 108) contain malicious software, from contacting network locations associated with the malicious software to perform undesired processing operations within the computer system 110. Further details concerning the operation of the security agent 150 will be provided shortly with respect to the flowchart of processing steps in FIG. 2.

It is noted that the security agent 150 may be stored on a computer readable medium (such as a floppy disk), hard disk, electronic, magnetic, optical or other computer readable medium. The security agent 150 may also be stored in a memory system 112 such as in firmware, read only memory (ROM), or, as in this example, as executable code in, for example, Random Access Memory (RAM). In addition to these embodiments, it should also be noted that other embodiments herein include the execution of the security agent application 150-1 in the processor 113 as the security agent process 150-2. Those skilled in the art will understand that the computer system 110 may include other processes and/or software and hardware components not shown in this example.

Figure 2:
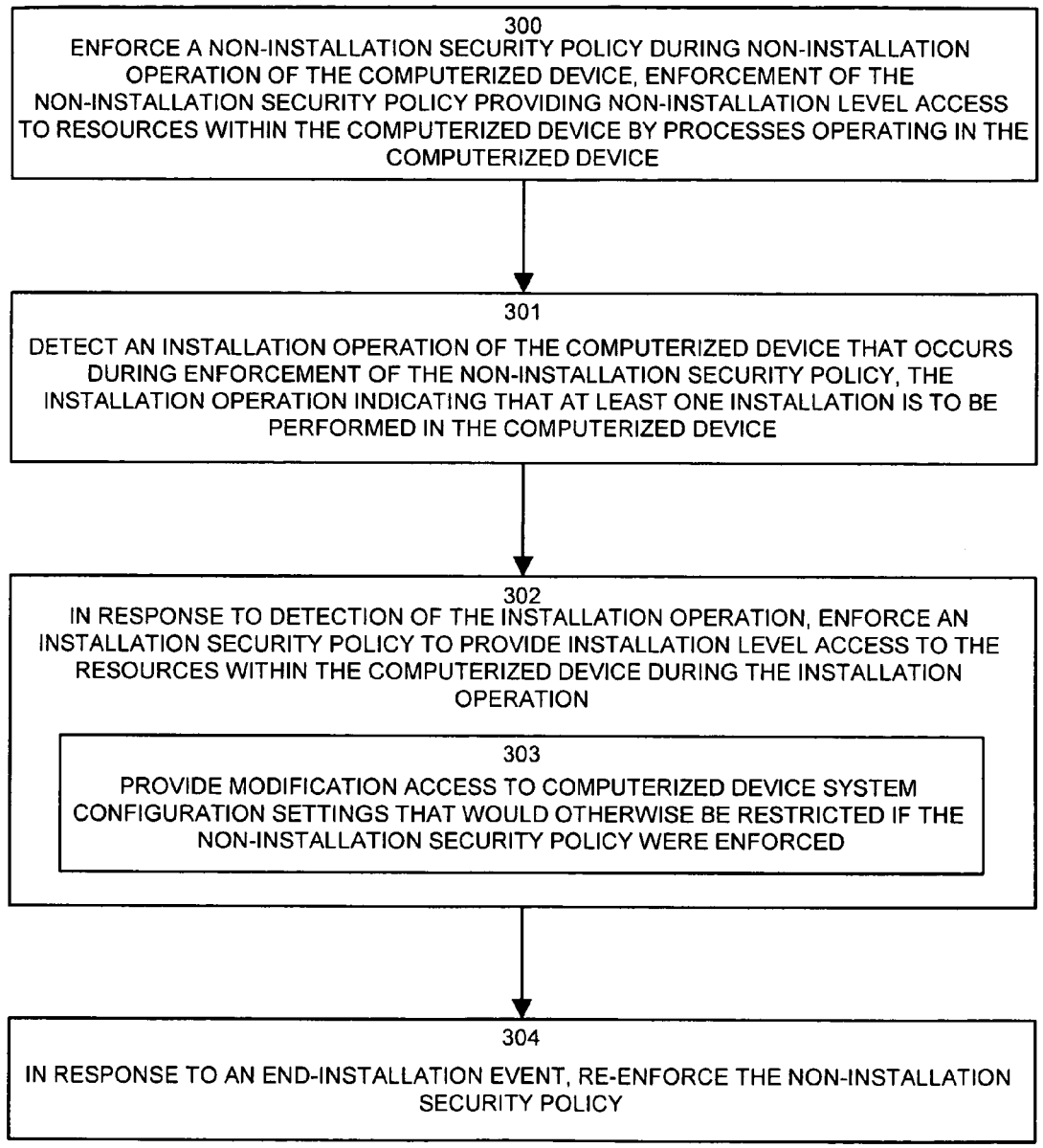
FIG. 2 is a flow chart of processing steps for providing security to a computerized device according to one example configuration disclosed herein.

FIG. 2 is a flow chart of high level processing steps that the security system including the security agent 150 performs in order to provide security to a computerized device 110 before, during and after software installations in accordance with one example embodiment.

In step 300, the security agent 150 enforces a non-installation security policy 211 during non-installation operation of the computerized device. Enforcement of the non-installation security policy 211 provides non-installation level access to resources within the computerized device by processes 121 operating in the computerized device. In one configuration, the non-installation security is a more restrictive security policy that disallows modification to computerized device system configuration settings. The non-installation security policy 211 may fully allow, for example, network access to the network 102 by any processes 121 and may allow processes 121 to invoke other applications 120. At the same time, the non-installation security policy 211 may disallow those processes 121 from modifying any system settings such as making changes to the operating system 131 or other sensitive areas of the computer system 110.

In step 301, the security agent 150 detects an installation operation of the computerized device 110 that occurs during enforcement of the non-installation security policy 211. The installation operation indicates that at least one installation is to be performed in the computerized device. In the illustrated example, the security agent 150 detects the initiation of a process (e.g., a software installation wizard, routine, library, system call, etc.) by the user 108 to install software 180 within the computer system 110. Embodiments of the invention are not limited to detecting and enforcing security during software installations, but rather, are applicable to any kind of installation such as software, hardware or a combination thereof.

In step 302, in response to detection of the installation operation, the security agent 150 enforces an installation security policy 212 to provide installation level access to the resources (e.g., operating system 131) within the computerized device during the installation operation. The installation security policy 212 for certain resources (e.g., operating system 131) is a less restrictive security policy that allows modification to computerized device system configuration settings. However, the installation security policy 212 may also specify that access to some resources, such as full network access, be disallowed or strictly limited in order to restrict the types of operations that the software installation operation is able to perform. By doing so, embodiments of the invention prevent large numbers of reported but erroneous security violations that often occur using conventional security monitoring applications that trigger many false positives during software installations when legitimate changes to system configuration settings are being performed. At the same time, by placing more restrictive controls on certain system resources such as the ability to launch third party applications such as email and to prevent access to most destinations within the network 102 (i.e., other than those associated with the software being installed), configurations disclosed herein prevent the ability for malicious software to accomplish its goal of compromising the computer system 110.

This is illustrated in sub-step 303, in which the security agent 150 provides modification access to computerized device system configuration settings such as the operating system 131 that would otherwise be restricted if the non-installation security policy were enforced.

In step 304, in response to an end-installation event, the security agent 150 re-enforces the non-installation security policy. An end-installation event may be, for example, termination of the software installation process such as an install wizard that is installing the software 180, or alternatively, such an end-installation event may be triggered by expiration of an installation timer or by an indication from the user 108 that the installation is complete.

Figure 3:
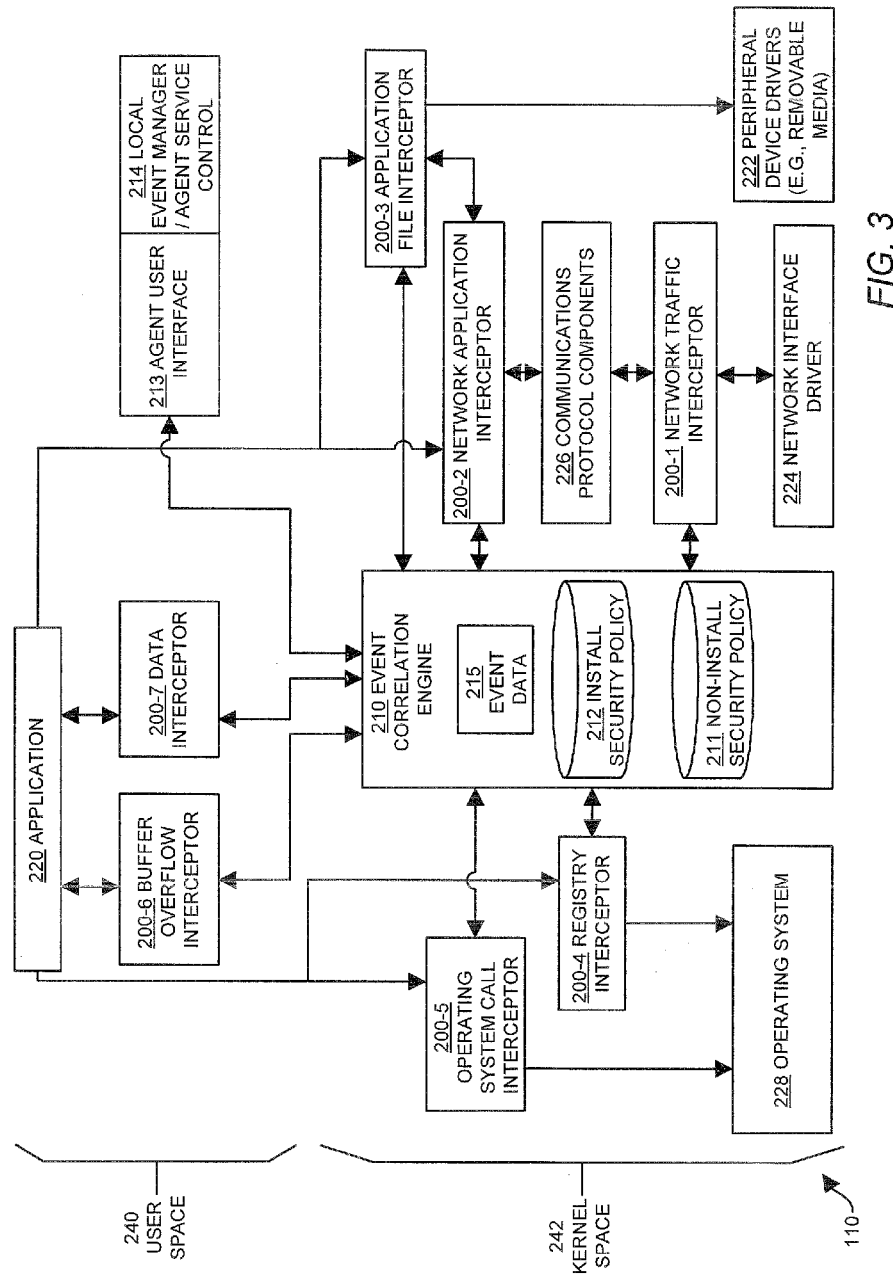
FIG. 3 illustrates example architecture of the computerized device configured with a security system in one example configuration.

FIG. 3 illustrates a detailed architecture of a security agent 150 configured within a computer system 110 in accordance with one example embodiment. The security agent 150 components include a plurality of security interceptors 200-1 through 200-7 including, for example, a network traffic interceptor 200-1, the network application interceptor 200-2, a file interceptor 200-3, a registry interceptor 200-4, a system call interceptor 200-5, a buffer overflow interceptor 200-6 and a data interceptor 200-7. The security agent 150 in this example configuration also includes an event correlation engine 210, an agent user interface 213, and local event manager 214. The event correlation engine 210 stores non-installation and installation security policies 211 and 212 that each contains rules that are used to instruct the components of the security agent 150 to protect various resources of the computer 110 by interpreting and enforcing the rules to restrict the operations that may be performed by that computer 110.

As an example, in one configuration, the network traffic interceptor 200-1 resides between a network interface driver 224 and the network interface card or other communications interface. The network traffic interceptor 200-1 is able to control transmission of packets coming to or from the network 102. In this manner, during software installations, such capability can prevent an installation process from accessing locations within the network 102 other than those designated by the user 108 as being acceptable network locations that might be required for purposes of software installation. As an example, when the security agent 150 detects the occurrence of an installation operation of software 180 to be installed within the computerized device 110, the installation policy 212 can indicate to the security agent 150 that the security agent 150 is to prompt the user any time the installation process intends to perform network communications with a remote location on the network 102. The security agent 150 can prompt the user 108 with a domain name service (DNS) resolved domain name associated with an IP address to which the installation process is attempting communication and can request (via a prompt on the display 160) whether or not the user 108 desires to allow the communication to proceed during the installation process.

In this manner, if software 180 being installed (and its associated installation process) within the computer system 110 requires the ability to communicate over the network 102 with a remote server, for example, to authenticate its software identity and/or receive operational credentials, the user 108 will be notified that such communication is being attempted to a specific destination (e.g., the manufacturer's web site of the product) and can provide authorization for such communication to proceed. However, if software being installed and/or its associated installation process makes an attempt to perform communications to a remote network location for malicious purposes, by prompting the user with the identity of the remote network location to which communications is being attempted, the user can disallow such communications and thus prevent the software being installed from compromising the security of the computer system 110. As a specific example, if the software being installed attempts to communicate with a remote location that is known to collect information from spyware that might be embedded within the software being installed, the user can be notified of this and can disallow this processing. It is to be understood that the term "software being installed" as used herein generally includes any processes such as installation wizards that execute to install a software application.

In an alternative configuration, the security agent 150 can be preconfigured with network destinations that are to be automatically disallowed and thus user prompting may not be required. In yet another alternative configuration, the security agent 150 can determine an identity of the software 180 being installed during the installation process and can determine remote network locations within the network 102 that are to be allowed based on the identity of the installed software (or on the identity of installation processes) and the security agent 150 allows communications only to those destinations while disallowing communications to other destinations by any process(es) associated with the software installation (e.g., if the application 180 being installed is from ABC Corporation, then allow communications only to ABC corporation servers).

It is to be understood that other resources within the computer system 110 can be controlled in a similar manner with other security interceptors 200 that can include packet interceptors, connection interceptors, file sharing interceptors, data filter interceptors, registry interceptors, system call interceptors, and the like. The interceptors 200 can be installed and executed by using, for example, windows registry keys that create dependencies on standard MS Windows dynamically linked libraries (dlls) so that the interceptor dlls 200 are loaded along with the appropriate windows dlls that they monitor. The interceptors 200 can thus serve as wrappers to monitor and control processing operations of all calls made to any specific computer components.

This example configuration also includes several components that operate within the computer system 110 that are not part of the security agent architecture itself. In particular, this example configuration includes one or more software applications 220 that execute within a user space 240 within the computer system 110. The software applications 220 are represented as processes 121 in FIG. 1. The computer system 110 further operates several components in kernel space 242 such as one or more device peripheral device drivers 222, a network interface driver 224, communications protocol components 226, and an operating system 228. Each of these is considered a resource to which access can be controlled as explained herein during software installation or during application of any other security policy corresponding to any other state. It is to be understood that the components 222 through 228 are illustrated as separate for purposes of description of operation of the invention, and that they may be combined together, such as an operating system that includes device drivers 222 and communication protocol components 226.

Generally then, interceptors 200 of the security agent 150 monitor processing activities and collect and report event data 215 to the event correlation engine 210 for the respective processing components 220 through 228 within the user and kernel spaces 240 and 242. The event correlation engine 210 can store and examine the event data to identify installation operations of to identify other states of the computerized device. Event data 215 can include things such as the identification of new connection requests made to the network interface driver 224 for remote software installations (i.e., for software being installed from the network 102), as detected by the network traffic interceptor 200-1, identification of boot time operations, shutdown operations, compromised operation (e.g., when a security interceptor detects a virus or other malicious program is operating or has altered the configuration of a computer), or other state operations or transition operations indication a change between states. As another example, the application file interceptor 200-3 can identify a processing activity such as an application 220 accessing a particular software installation file such as an operating system install wizard via an operating system call or file system call and report this as event data 215 to the event correlation engine 210. A name or a hash of an executable file are other mechanisms for recognizing specific type of operations, such as installation applications. There may be other interceptors 200 besides those illustrated in FIG. 2 and thus the interceptors 200-1 through 200-7 are shown by way of example only. The event correlation engine 210 correlates the event data 215 to identify installation operations in this example and in response, activates the installation security policy 212. Likewise, for other states, appropriate security policies can be provided and activated, depending on the security requirements of each state. This allows the event correlation engine 210 to instruct the interceptors 200 to restrict or allow access to resources as needed. Also, installation programs can be recognized by name alone.

Other processing operations related to security for a computerized device are explained in reference to the security agent architecture shown in FIG. 3 in co-pending U.S. patent application Ser. No. 11/031,212 entitled "METHODS AND APPARATUS PROVIDING SECURITY TO COMPUTER SYSTEMS AND NETWORKS" filed Jan. 7, 2005. Another patent that describes the ability to capture state information is U.S. patent application Ser. No. 10/071,328 entitled "STATEFUL REFERENCE MONITOR" filed Feb. 8, 2002. The entire teachings and contents of these reference patent applications are hereby incorporated by reference herein in their entirety. Further details of security agent operation will now be provided with respect twin flowchart processing steps shown in FIG. 4 through 7.

FIGS. 4 through 7 are a single flow chart of processing operations that show further details of security provided by a security agent during software installation in accordance with configurations disclosed herein.

Figure 4:
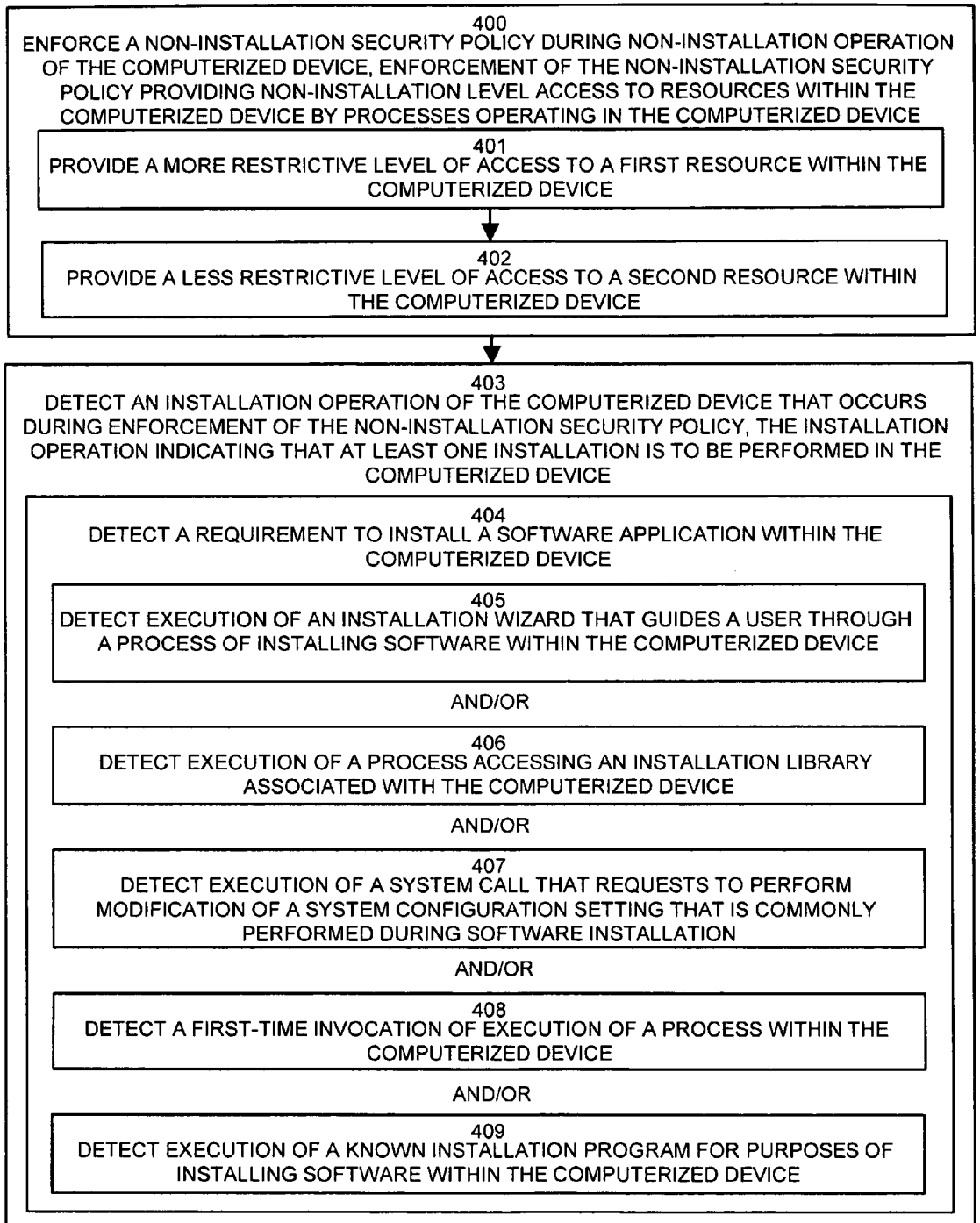
FIGS. 4 through 7 are a flow chart of example processing operations performed by the computer security system as disclosed herein.

In step 400 in FIG. 4, the security agent 150 enforces a non-installation security policy 211 during non-installation operation of the computerized device. Non-installation operation of the computerized device 110 generally includes normal execution of user level applications. Details of this processing are shown below.

In step 401, the security agent 150 provides a more restrictive level of access to a first resource within the computerized device. In one configuration, the first resource is a computer system configuration resource of the computerized device that can include, for example, an operating system setting, a registry value setting, or a dynamically linked library being added or removed from the computerized device. Any other type of computer system resource that is typically isolated from modification by user applications during normal execution is restricted as specified in the non-installation security policy 211. Other examples include access to "root-level" system settings or other controlled areas of the computer system 110.

In step 402, the security agent 150 provides a less restrictive level of access to second resources within the computerized device. Note that this step is optional, and that the policy does not have to specify actions to be associated with non-installation processes (e.g., other process executing in the computer). In one configuration, the second resource is a computer system processing resource of the computerized device used in normal (i.e., non-installation time) processing by an application. Examples include network access to or from the computerized device or access to a user application that is different than the software application being executed within the computerized device. Thus, access is less restricted to third party applications such as email during enforcement of non-installation security policies. Note that there may be more than one type or level of non-installation security policy 211, and certain processes 121 or applications 120 may have specially designed or custom non-installation security policies 211.

In step 403, the security agent 150 detects an installation operation of the computerized device 110 that occurs during enforcement of the non-installation security policy. As discussed above, the installation operation indicates that at least one installation is to be performed in the computerized device. This can be a hardware or software installation, but for purposes of this example configuration, a software installation of software 180 as shown in FIG. 1 is used in this example.

In step 404, the security agent 150 detects a requirement to install a software application within the computerized device. Sub-steps 405 through 409 show example configurations of mechanism to detect the occurrence of an installation operation. Note that one or more of these may occur in sequence or in parallel.

In step 405, the security agent 150 detects occurrence, during enforcing the non-installation security policy, of execution of an installation wizard that guides the user 108 through a process of installing software within the computerized device. This may be triggered when the user 108 inserts media into the computer system 110 that launches an install program, or when the user downloads software from the network 102 which then begins to install itself or another program remotely from the network 102.

In step 406, the security agent 150 detects occurrence, during enforcing the non-installation security policy, of execution of a process accessing an installation library associated with the computerized device. The operating system 131 can contain special libraries used for installing software and if a security interceptor 200 in FIG. 2 detects access to such a library, the event correlation engine 210 may identify this as the beginning of an installation process.

In step 407, the security agent 150 detects occurrence, during enforcing the non-installation security policy, of execution of a system call that requests to perform modification of a system configuration setting that is commonly performed during software installation. In this manner, if a program or process makes a system call that is typically a forerunner to performing an install, a security interceptor 200 can detect this event and report this to the event correlation engine 210 that can identify this action as an install operation.

In step 408, the security agent 150 detects occurrence, during enforcing the non-installation security policy, of a first-time invocation of execution of a process within the computerized device. In this manner, even if a software application does not perform an official installation process using, for example, an install wizard, but was simply a stand-alone executable program or file that is stored within a storage mechanism or other peripheral device 222 of the computer system 210, the event correlation engine 210 within the security agent 150 can keep a list of all programs, applications or processes that it has installed and/or executed in the past. Using such a list, when any program, application or process executes the first time within the computer system 110, the security agent 150 can detect an initial run-time occurrence or a process that was not installed before and can designate this as an installation operation in order to apply an installation security policy 212.

In such cases, since there is no official installation operation performed before executing the process for the first time, the security agent 150 can apply a special heavily restrictive installation security policy 212 for a period of time such as for five minutes after the occurrence of the installation operation (i.e., after the initial launching of a program "seen" for the first time) in order to closely monitor its operation. In addition, in situations where initial execution of a process is identified as the installation operation, the special installation security policy 212 can heavily restrict access to many resources within the computerized device such as many system configuration settings. In other words, one version of an installation security policy 212 provides heavily restrict access to resources in the computer system such as computer system configuration settings that other installation security policies 212 may not restrict so much. Accordingly, configurations disclosed herein and can selectively engage an appropriate installation security policy 212 depending upon what type of installation operation is detected. Typically, when an installation wizard is used to install software, the installation wizard provides a controlled environment for modification of system configuration settings and an installation security policy 212 used during a wizard-guided installation operation may provide less restricted access to system configuration resources such as registry settings. However, for situations involving initial execution of a process that has not yet been identified in any manner (e.g., was not recognized as being previously installed using another installation operation), the security agent 150 can select and apply a much more restrictive installation security policy 212.

In step 409, the security agent 150 detects occurrence, during enforcing the non-installation security policy, of execution of a known installation program for purposes of installing software within the computerized device. This example illustrates detection of operation, for example, of an installation wizard or other program specifically designed for installing software. After step 409 is complete, processing continues in step 410 in FIG. 5.

Figure 5:
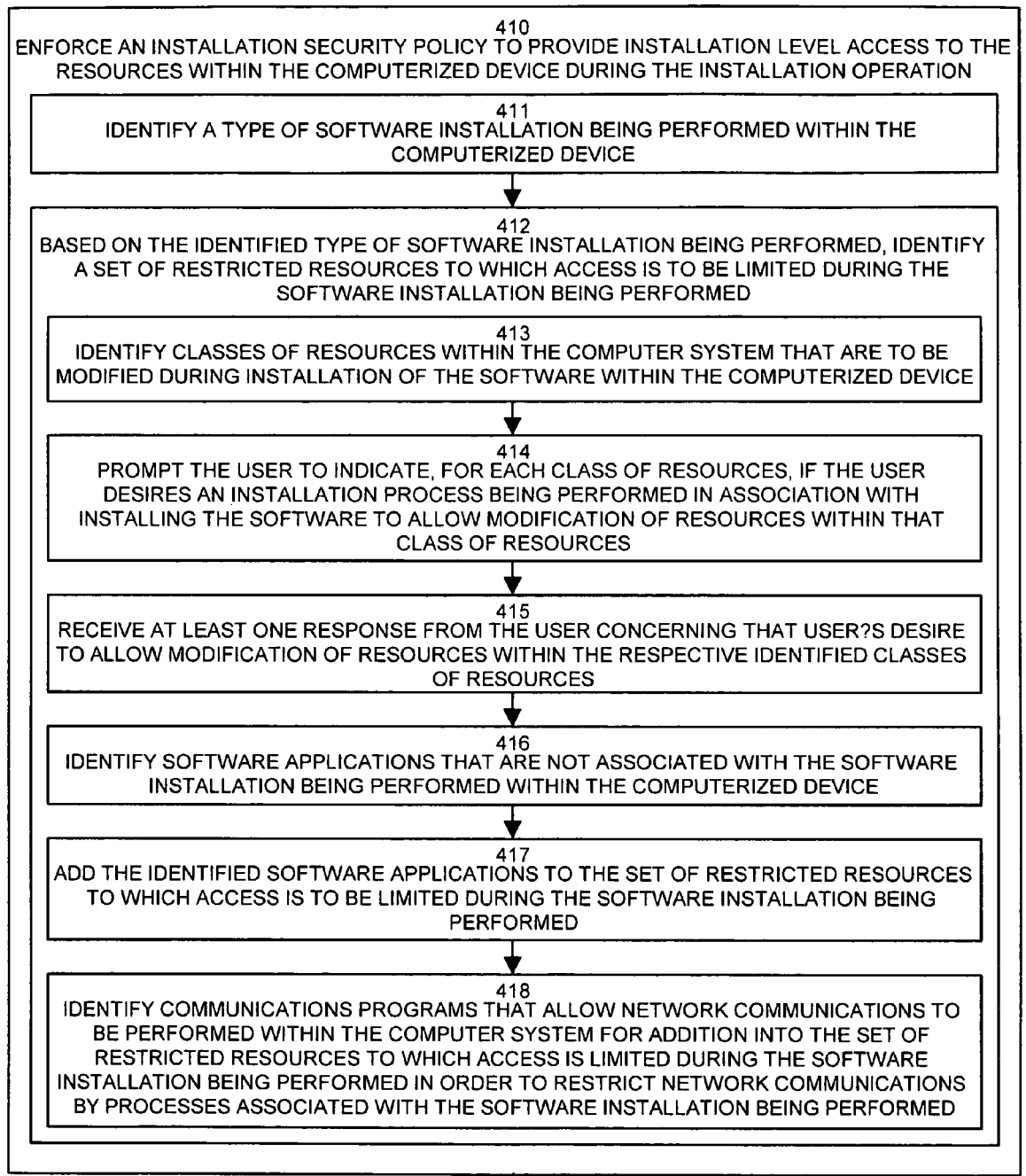

FIG. 5 is a continuation of the flow chart from FIG. 4 and shows further details of security provided during software installation in accordance with configurations disclosed herein.

In step 410, in response to detection of the installation operation, the security agent 150 enforces an installation security policy 212 to provide installation level access to the resources within the computerized device during the installation operation. Sub-steps 411 through 424 (FIG. 6) show details of this processing in accordance with example configurations.

In step 411, the security agent 150 identifies a type of software installation being performed within the computerized device. As discussed above, different types of software installations might require different types of controls for certain resources within the computerized device. The type of software installation identified in step 411 can be based, for example, on the type of installation operation detected that will be used to perform the software installation such as, for example, a wizard installation, or a network installation, or a system call installation, or another type of installation mechanism. Alternatively, the security agent 150 can detect the type of software installation being performed based on the nature of the software being installed. As an example, the security agent 150 might recognize the software as a network application or as a user application. This information can be relevant for selecting an appropriate installation security policy 212 as well as for identifying which specific resources are to be less restricted and which resources are to be more restrictive in terms of access during the installation process.

In step 412, based on the identified type of software installation being performed, the security agent 150 identifies a set of restricted resources to which access is to be limited during the software installation being performed. As discussed above, this may be performed by having the security agent 150 identify an appropriate installation security policy 212 based on the type of installation being performed. The installation security policy 212 can indicate what resources are to be protected and are what manner or level during the installation process. Sub-steps 413 through 418 show example configurations to perform this processing. It is to be understood that not all of these operations are required.

In step 413, the security agent 150 identifies classes of resources within the computer system that are to be modified during installation of the software within the computerized device. As an example, if a network application is being installed, certain network libraries might be updated and certain operating system registry entries associated with networking might be required to be changed during the installation process. Other examples can be classified into groups or classes of resources such as networking resources, operating system resources, application level resources, user account resources, and so forth.

In step 414, the security agent 150 prompts the user to indicate, for each class or group of resources, if the user desires an installation process being performed in association with installing the software to allow modification of resources within that class of resources. Note that this step is optional and that the system may operate with out user interaction as well. In this manner, this example configuration can avoid having to prompt the user for every single detailed change that will be required to every single type of resource in the computer system during the installation process. Instead, by grouping resources into categories, classes or groups and prompting a user at the beginning of installation process as to which types of changes the user is willing to allow, many false positives can be avoided and the installation process can be significantly streamlined.

In step 415, the security agent 150 receives at least one response from the user concerning that user's desire to allow modification of resources within the respective identified classes of resources.

In step 416, the security agent 150 identifies software applications that are not associated with the software installation being performed within the computerized device. As an example, if the software being installed is a network application, other user applications not associated with networking, such as third party software programs and the like can be identified as resources that should not be allowed to be accessed during installation process.

In step 417, the security agent 150 adds the identified software applications to the set of restricted resources to which access is to be limited during the software installation being performed.

In step 418, the security agent 150 identifies communications programs that allow network communications to be performed within the computer system for addition into the set of restricted resources to which access is limited during the software installation being performed in order to restrict network communications by processes associated with the software installation. Since many malicious attacks on computer systems involved or require access to network communications, the processing of step 418 allows the security agent 150 to restrict network applications from execution during the installation process by processes associated with that installation. Note network connectivity is only used as an example. Other examples might include preventing ability to open email attachments or other such activities.

It is to be understood at the aforementioned steps 413 through 418 may be optional depending upon configurations desired. The processing of step 410 in the flow chart continues at the top of the flow chart illustrated in FIG. 6.

Figure 6:
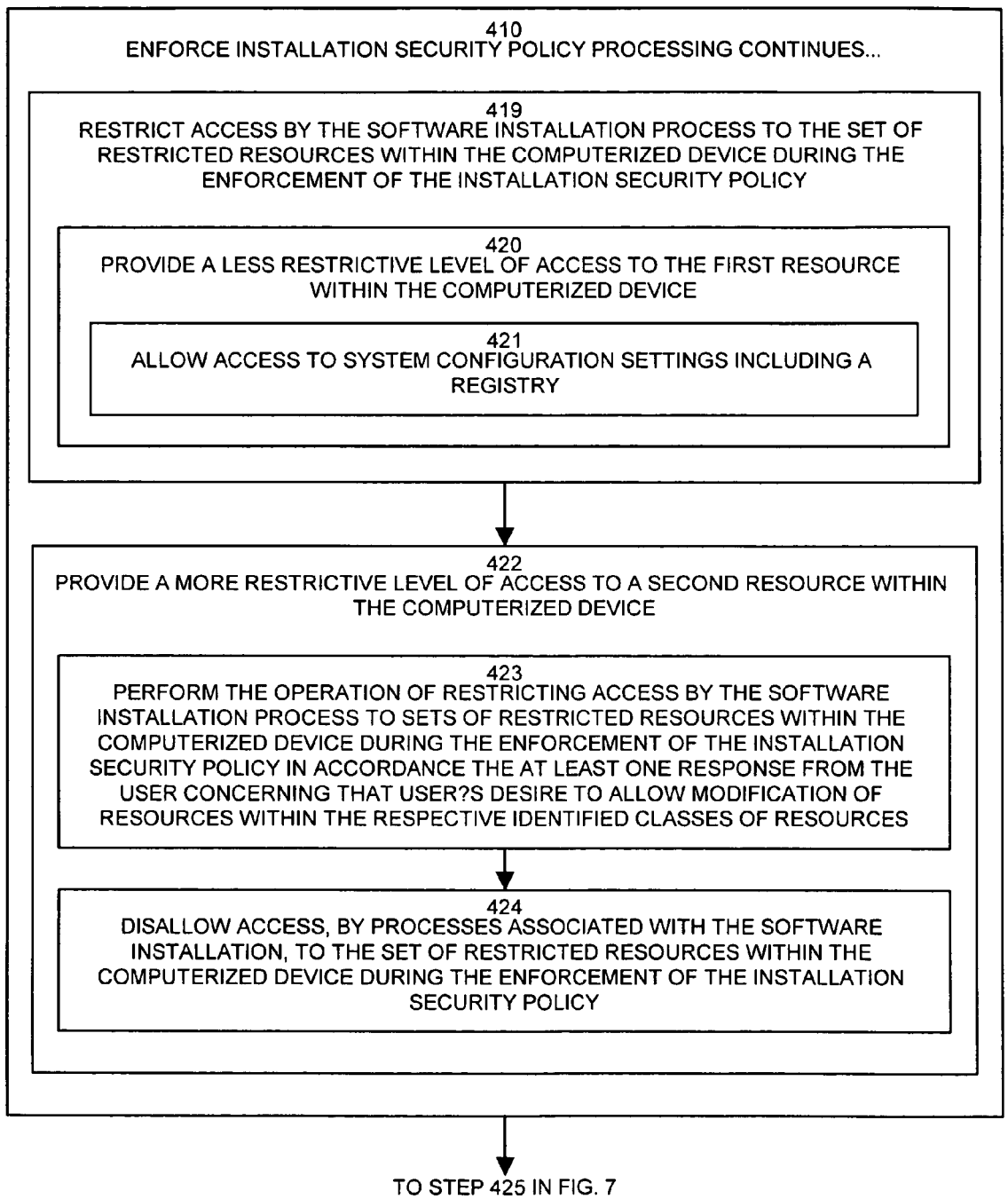

FIG. 6 is a continuation of the flow chart from FIG. 5 and shows further details of security provided in step 410 during software installation in accordance with configurations disclosed herein.

In step 419, the security agent 150 restricts access by the software application being installed (and/or any related installation processes) to the set of restricted resources within the computerized device during the enforcement of the installation security policy 212.

In step 420, the security agent 150 provides a less restrictive level of access to a first group of resources within the computerized device. Sub-step 421 shows an example of this.

In step 421, the security agent 150 allows access to system configuration settings including a registry. Thus, in this example, the system of the invention invokes an installation security policy 212 that allows access to registry modifications.

In step 422, the security agent 150 provides a more restrictive level of access to a second resource within the computerized device. Sub-steps 423 and 424 show an example configuration of this processing.

In step 423, the security agent 150 performs the operation of restricting access by the software application being installed (and/or any related installation processes) to sets of restricted resources within the computerized device during the enforcement of the installation security policy in accordance the at least one response from the user concerning that user's desire to allow modification of resources within the respective identified classes of resources. As discussed above in steps 413 through 415, one example configuration of the invention can indicate the user different groups of resources which are to be allowed were denied access in the form of modification during installation process and in step 423, the security agent 150 to allow the installation process access to those resources in accordance with the user selections. Is to be understood that other embodiments of the invention do not rely on or require user interaction other than to perform installation process itself and the security agent processing of such configurations operates in the background to enforce the installation security policy in a manner that does not require user involvement.

In step 424, the security agent 150 disallows access, by processes associated with the software installation, to the set of restricted resources within the computerized device during the enforcement of the installation security policy 212. Because the security agent 150 described is able to selectively restrict access to some resources while enhancing access to other resources during the installation process, fewer false positives are received during an installation process while at the same time, security is enhanced since restrictions are placed upon access to resources that might allow a malicious software program to exploit an opportunity to compromise the computer system 110.

Figure 7:
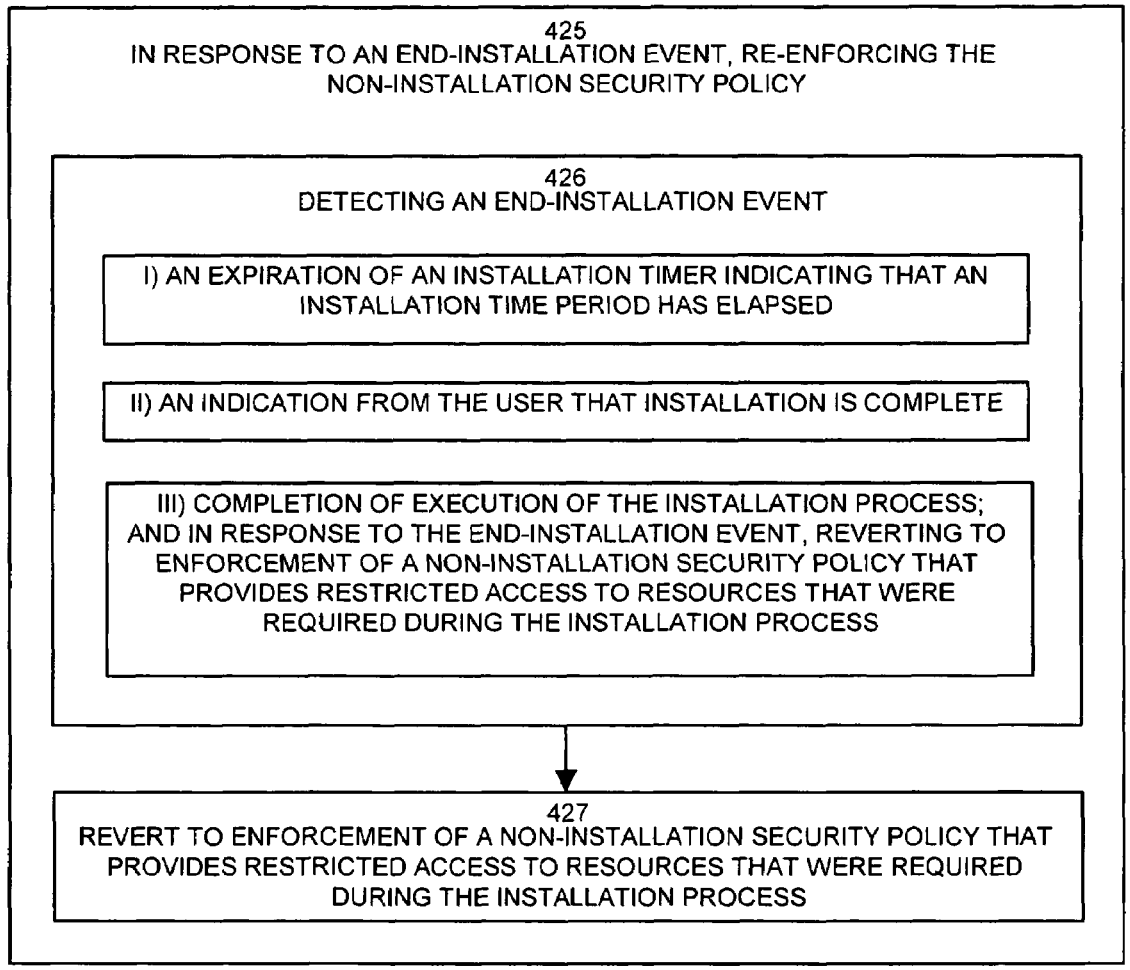

FIG. 7 is a continuation of the flow chart from FIG. 6 and shows further details of security provided during software installation in accordance with configurations disclosed herein.

In step 425, in response to an end-installation event, the security agent 150 re-enforces the non-installation security policy. Sub-step 426 shows examples of end-installation events.

In step 426, the security agent 150 detects an end-installation event by either detecting an expiration of an installation timer indicating that an installation time period has elapsed, or detecting an indication from the user that installation is complete, or by detecting completion of execution of the installation process. Accordingly, with configurations as disclosed herein provide several mechanisms which allow transition from application or enforcement of the installation security policy 212 back to the non-installation security policy 211 when installation is determined to be complete, as noted above, in some situations the timer can be set upon detection of installation operation and during the period of expiration of the timer, the installation security policy 212 is enforce.

In one configuration, there can be multiple timers. For example, there might be an overall installation timer that last one hour in which the install must complete. Another timer might look for inactivity of the installation process and switch back to the non-installation policy (e.g., after 15 minutes of inactivity).

Alternatively, the user may indicate when installation is complete or the security agent 150 may detect completion of the installation automatically such as by recognizing that the installation process is no longer executed. It is to be understood that a combination of these terminating events can be applied in various configurations. As an example, a timer may be used in addition to recognizing termination of the installation process. In one example configuration, a timer may always be used even if the security agent 150 recognizes an installation process is terminated. Thus the system reverts to the non-installation security policy after the end-installation event and after expiration of a predetermined time period (e.g., five minutes after the install is complete) after occurrence of the end-installation event. This may be useful in situations in which in installation process happens fairly quickly (e.g., over the course of only a few seconds) and shortly thereafter, the user that performs or executes the software program that was just installed. By maintaining an installation timer that expires, for example, after three or five minutes after detecting the installation operation (or after detecting its completion), the security agent 150 can maintain enforcement of the installation security policy 212 even though technically installation is now complete. This prevents compromise of the computer system 110 by an application that appears to install correctly but then attempts to perform a malicious activity shortly after its execution begins.

In step 427, in response to the end-installation event, the security agent 150 reverts to enforcement of a non-installation security policy that provides restricted access to resources that were required during the installation process.

Accordingly, the aforementioned processing allows the detection of atypical system states that require a security policy that differs from a normal non-installation security policy. While in this atypical state, security is adapted as necessary and tighter security can be provided by limiting, for example, network access during installation and disabling access to third party applications while at the same time providing less restrictive access to system resources generally associated with the installation of software, such as modification to system configuration settings. Configurations disclosed herein thus result in fewer false positives during the installation process while still providing enhanced security over conventional monitoring applications.

While the system and method have been particularly shown and described with references to configurations thereof, it will be understood by those skilled in the art that various changes in form and details may be made therein without departing from the scope of the invention encompassed by the appended claims. Accordingly, the present invention is not intended to be limited by the example configurations provided above.

What is claimed is:

1. A method for controlling security during operation of a computerized device, the method comprising:
    enforcing a first security policy during a first operational state of the computerized device, enforcement of the first security policy providing a first level access to resources within the computerized device by processes operating in the computerized device;
    detecting a transition operation of the computerized device that occurs during enforcement of the first security policy, the transition operation indicating that operation of the computerized device is transitioning from the first operational state to a second operational state;
    in response to detection of the transition operation, enforcing a second security policy corresponding to the second operational state to provide a level of access to the resources within the computerized device that corresponds to the second operational state during operation of the second operational state;
    wherein enforcing the first security policy during the first operational state comprises enforcing a non-installation security policy during a non-installation operation of the computerized device, enforcement of the non-installation security policy providing non-installation level access to resources within the computerized device by processes operating in the computerized device;
    wherein detecting the transition operation comprises detecting an installation operation of the computerized device that occurs during enforcement of the non-installation security policy, the installation operation indicating that at least one installation is to be performed in the computerized device;
    wherein enforcing the second security policy comprises enforcing an installation security policy to provide installation level access to the resources within the computerized device during the installation operation, in response to detection of the installation operation; and
    in response to an end-installation event, re-enforcing the non-installation security policy.

2. The method of claim 1 wherein enforcing the non-installation security policy comprises:
    providing a more restrictive level of access to a first resource within the computerized device;
    providing a less restrictive level of access to a second resource within the computerized device;
    wherein detecting the installation operation of the computerized device comprises: detecting a requirement to install a software application within the computerized device; and
    wherein enforcing the installation security policy to provide installation level access to the resources within the computerized device during the installation operation comprises:
    providing a less restrictive level of access to the first resource within the computerized device; and
    providing a more restrictive level of access to the second resource within the computerized device.

3. The method of claim 2 wherein the first resource is a computer system configuration resource of the computerized device including at least one of:
    i) an operating system setting;
    ii) a registry value setting;
    iii) a file being added or removed from the computerized device; and
    wherein the second resource is a computer system processing resource of the computerized device including at least one of:
    i) network access to or from the computerized device;
    ii) access to a user application that is different than the software application being installed within the computerized device.

4. The method of claim 2 wherein detecting the requirement to install the software application within the computerized device comprises:
    detecting occurrence, during enforcing the non-installation security policy, of at least one of:
    i) execution of an installation wizard that guides a user through a process of installing software within the computerized device;
    ii) execution of a process accessing an installation library associated with the computerized device;
    iii) execution of a system call that requests to perform modification of a system configuration setting that is commonly performed during software installation; and
    iv) a first-time invocation of execution of a process within the computerized device; and
    v) execution of a known installation program for purposes of installing software within the computerized device.

5. The method of claim 4 wherein enforcing the installation security policy to provide installation level access to the resources within the computerized device during the installation operation comprises:
    identifying a type of software installation being performed within the computerized device;
    based on the identified type of software installation being performed, identifying a set of restricted resources to which access is to be limited during the software installation being performed; and
    restricting access by the software installation process to the set of restricted resources within the computerized device during the enforcement of the installation security policy.

6. The method of claim 5 wherein identifying the set of restricted resources to which access is to be limited during the software installation being performed comprises:
    identifying classes of resources within the computerized device that are to be modified during installation of the software within the computerized device;
    prompting the user to indicate, for each class of resources, if the user desires an installation process being performed in association with installing the software to allow modification of resources within that class of resources;
    receiving at least one response from the user concerning that users desire to allow modification of resources within the respective identified classes of resources; and
    performing the operation of restricting access by the software installation process to sets of restricted resources within the computerized device during the enforcement of the installation security policy in accordance the at least one response from the user concerning that users desire to allow modification of resources within the respective identified classes of resources.

7. The method of claim 5 wherein identifying the set of restricted resources to which access is to be limited during the software installation being performed comprises:
    identifying software applications that are not associated with the software installation being performed within the computerized device;
    adding the identified software applications to the set of restricted resources to which access is to be limited during the software installation being performed; and wherein restricting access by the software installation process to the set of restricted resources within the computerized device during the enforcement of the installation security policy comprises:
disallowing access, by processes associated with the software installation, to the set of restricted resources within the computerized device during the enforcement of the installation security policy.

8. The method of claim 7 wherein identifying software applications that are not associated with the software installation being performed within the computerized device comprises:
identifying communications programs that allow network communications to be performed within the computerized device for addition into the set of restricted resources to which access is limited during the software installation being performed in order to restrict network communications by processes associated with the software installation being performed.

9. The method of claim 8 wherein providing the less restrictive level of access to the first resource within the computerized device comprises:
allowing access to system configuration settings including a registry.

10. The method of claim 2 wherein the end-installation event comprises at least one of:
i) an expiration of an installation timer indicating that an installation time period has elapsed;
ii) an indication from the user that installation is complete;
iii) completion of execution of the installation process
and in response to the end-installation event, reverting to enforcement of a non-installation security policy that provides restricted access to resources that were required during the installation process.

11. The method of claim 10 wherein in response to the end-installation event, reverting to enforcement of the non-installation security policy comprises:
reverting to the non-installation security policy after the end-installation event and after expiration of a predetermined time period after occurrence of the end-installation event.

12. The method of claim 1 wherein the non-installation security is a more restrictive security policy that disallows modification to computerized device system configuration settings and the installation security policy is a less restrictive security policy that allows modification to computerized device system configuration settings; and wherein enforcing the installation security policy to provide installation level access to the resources within the computerized device during the installation operation comprises:
providing modification access to computerized device system configuration settings that would otherwise be restricted if the non-installation security policy were enforced.

13. The method of claim 1 wherein the first and second operational states and corresponding first and second security policies corresponding respectively to the first and second operational states are selected from the group consisting of:
i) a boot-state in which the computerized device is performing a startup operation, and a boot-time security policy that restricts access to resources within the computer during the startup operation;
ii) a shutdown-state in which the computerized device is performing a shutdown operation, and wherein the security policy is a shutdown security policy that restricts access to resources within the computer during the shutdown operation;
iii) a normal-state in which the computerized device is performing execution of user applications, and wherein the security policy is a normal run-time security policy that restricts modification access to system configuration resources within the computer during the normal run-time operation of user application;
iv) a compromised-state in which the computerized device is determined to be configured with a malicious program, and wherein the security policy is a compromised security policy that restricts all access to system configuration resources within the computer during the compromised state; and
v) an installation-state in which the computerized device is performing an installation operation, and wherein the security policy is a installation security policy that restricts access to non-installation related resources within the computer during the installation operation and de-restricts access to installation related resources within the computerized device.

14. A computer readable medium including computer program logic instruction encoded thereon, that when executed on a processor in a computerized device, causes the computerized device to perform the operations of:
enforcing a first security policy during a first operational state of the computerized device, enforcement of the first security policy providing a first level access to resources within the computerized device by processes operating in the computerized device;
detecting a transition operation of the computerized device that occurs during enforcement of the first security policy, the transition operation indicating that operation of the computerized device is transitioning from the first operational state to a second operational state;
in response to detection of the transition operation, enforcing a second security policy corresponding to the second operational state to provide a level of access to the resources within the computerized device that corresponds to the second operational state during operation of the second operational state;
wherein enforcing the first security policy during the first operational state comprises enforcing a non-installation security policy during a non-installation operation of the computerized device, enforcement of the non-installation security policy providing non-installation level access to resources within the computerized device by processes operating in the computerized device;
wherein detecting the transition operation comprises detecting an installation operation of the computerized device that occurs during enforcement of the non-installation security policy, the installation operation indicating that at least one installation is to be performed in the computerized device;
wherein enforcing the second security policy comprises enforcing an installation security policy to provide installation level access to the resources within the computerized device during the installation operation, in response to detection of the installation operation; and
in response to an end-installation event, re-enforcing the non-installation security policy.

15. A computerized device, comprising:
a memory configured to store one or more security policies;
a processor;
a communications interface configured to couple to a network;
an interconnection mechanism coupling the memory, the processor and the communications interface; and
a security agent to control:
enforcing a first security policy during a first operational state of the computerized device, where enforcing the first security policy provides a first level of access to resources in the computerized device by processes operating in the computerized device, where the first security policy is stored in the memory;

placing the computerized device in a monitoring state to monitor for a transition operation;

switching, in response to detecting a transition operation, to enforcing a second security policy corresponding to a second operational state associated with the transition operation, wherein the second security policy corresponding to the second operational state provides a custom level of access to the resources in the computerized device based, at least in part, on the transition operation, wherein the second security policy is stored in the memory;

returning to the monitoring state subsequent to transitioning to the second security policy;

wherein enforcing the first security policy comprises enforcing a non-installation security policy during a non-installation operational state of the computerized device, and wherein enforcement of the non-installation security policy provides non-installation level access to resources in the computerized device by processes operating in the computerized device;

wherein detecting the transition operation comprises detecting an installation operation in the computerized device during enforcement of the non-installation security policy, the installation operation indicating that at least one installation is to be performed in the computerized device;

wherein enforcing the second security policy comprises enforcing an installation security policy to provide installation level access to the resources in the computerized device during the installation operation, in response to detection of the installation operation; and in response to detecting an end-installation transition operation, switching to enforcing the non-installation security policy.

16. The computerized device of claim 15, wherein the non-installation security policy provides a first threshold level of access to a first resource and a second threshold level of access to a second resource; and wherein the installation security policy provides lower threshold level of access to the first resource and a higher threshold level of access to the second resource than the non-installation security policy.

17. The computerized device of claim 16, wherein the first resource is a computer system configuration resource of the computerized device comprising at least one of: an operating system setting, a registry value setting, and a file being added or removed from the computerized device; and wherein the second resource is a computer system processing resource of the computerized device including at least one of: network access to or from the computerized device, and access to a user application that is different than a software application being installed within the computerized device.

18. The computerized device of claim 16 where detecting the transition operation comprises detecting at least one of:

execution of an installation wizard that guides a user through a process of installing software within the computerized device, execution of a process accessing an installation library associated with the computerized device, execution of a system call that requests modification of a system configuration setting that is commonly performed during software installation a first-time execution of a process within the computerized device, and execution of a known installation program.

19. The computerized device of claim 18, wherein detecting the transition operation comprises:

identifying a type of software installation being performed within the computerized device; and restricting access to a set of resources in the computerized device during the enforcement of the installation security policy, based, at least in part, on the type of software installation being performed.

20. The computerized device of claim 19, wherein restricting access to the set of resources in the computerized device comprises:

identifying classes of resources in the computerized device to be modified during software installation;

prompting a user to indicate whether to allow modification of resources within a class of resources;

receiving at least one response from the user indicating whether to allow modification of resources within a class of resources; and restricting access by the software installation process to sets of resources within the computerized device during enforcement of the installation security policy in accordance with at least one response from the user.

21. The computerized device of claim 19, where restricting access to the set of resources in the computerized device comprises:

disallowing access, by processes associated with the software installation, to the set of resources within the computerized device during the enforcement of the installation security policy.

22. The computerized device of claim 20, wherein the security agent further controls:

identifying software applications that are not associated with the software installation; and adding communications programs that allow network communications to the set of resources to which access is limited during the software installation being performed, in order to restrict network communications by processes associated with the software installation.

23. The computerized device of claim 17, wherein detecting the end-installation transition operation comprises detecting at least one of: an expiration of an installation timer indicating that an installation time period has elapsed, an indication from the user that installation is complete, and completion of execution of the installation process.

24. The computerized device of claim 16, wherein the non-installation security policy disallows modification to computerized device system configuration settings and the installation security policy allows modification to computerized device system configuration settings; and wherein enforcing the installation security policy to provide installation level access to the resources in the computerized device during the installation operation comprises:

providing modification access to computerized device system configuration settings that would otherwise be restricted if the non-installation security policy were enforced.

* * * * *

UNITED STATES PATENT AND TRADEMARK OFFICE
CERTIFICATE OF CORRECTION

PATENT NO. : 7,681,226 B2  Page 1 of 1
APPLICATION NO. : 11/046302
DATED : March 16, 2010
INVENTOR(S) : Jeffrey A. Kraemer et al.

It is certified that error appears in the above-identified patent and that said Letters Patent is hereby corrected as shown below:

In the claims:

Claim 6, column 20, line 51    Please replace "users" with "user's"

Claim 6, column 20, line 57    Please replace "users" with "user's"

Claim 18, column 23, line 63   Please insert a --,-- following the word "installation" so that it reads "installation,"

Signed and Sealed this

Third Day of August, 2010

David J. Kappos
*Director of the United States Patent and Trademark Office*